J. H. ALBRECHT.
MOTOR CONTROL SYSTEM.
APPLICATION FILED APR. 5, 1916.
1,415,971.
Patented May 16, 1922.
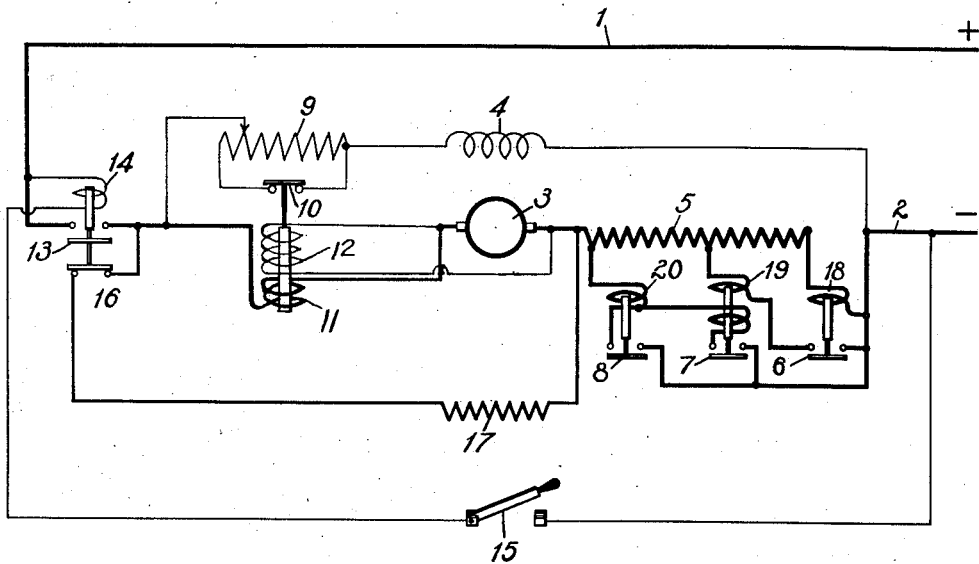
WITNESSES:
R. J. Fitzgerald
J. R. Langley.
INVENTOR
John H. Albrecht.
BY
Wesley G. Carr
ATTORNEY

UNITED STATES PATENT OFFICE.

JOHN H. ALBRECHT, OF PITTSBURGH, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,415,971.  Specification of Letters Patent.  Patented May 16, 1922.

Application filed April 5, 1916. Serial No. 89,098.

*To all whom it may concern:*

Be it known that I, JOHN H. ALBRECHT, a citizen of the United States, and a resident of Pittsburgh, in the county of Allegheny and State of Pennsylvania, have invented a new and useful Improvement in Motor-Control Systems, of which the following is a specification.

My invention relates to motor-control systems and particularly to such systems as embody means for automatically controlling the field excitation of electric motors.

My invention has for its object to provide a simple and efficient means for automatically controlling the field excitation of electric motors during acceleration and during dynamic braking for bringing the motors to rest.

In the operation of starting electric motors, it is desirable that the motors be provided initially with a relatively strong field and then with a materially weakened field after the starting resistance has been removed from the armature circuit. It is desirable, also, during the period of dynamic braking, to employ a relatively weak field when the dynamic braking circuit is initially closed in order to prevent an abnormal dynamic braking action and then, as the speed decreases, to strengthen the field in order to increase the dynamic braking effect at the lower speeds and thus shorten the period of dynamic braking.

To accomplish the above results, I provide a relay for controlling a shunt circuit for the shunt-field resistor that is automatically operated in accordance with circuit conditions of the motor in connection with which it is employed. The relay is provided with concentrically arranged actuating coils that are respectively in series and in shunt relation to the motor armature. The coils are wound to oppose each other during normal operation of the motor and to assist each other when the motor operates as a generator. Normally, the series coil tends to close the relay, and the shunt coil, by creating a magnetic field opposed to that of the series coil, tends to open the relay.

During the initial portion of the period of acceleration, the series coil predominates and the relay is retained in its closed position. As the motor accelerates and its counter-electromotive force increases, the shunt coil is sufficiently energized to effect the opening of the switch, and the excitation of the field winding of the motor is accordingly decreased. When the motor operates as a generator during the period of dynamic braking, the coils of the relay energize magnetic fields of like polarity and assist each other to retain the relay in its open position until the current traversing the dynamic braking circuit and the counter electromotive force of the motor have fallen to predetermined values.

The details of my invention will be described in connection with the accompanying drawing in which the single figure is a diagrammatic view of circuits and apparatus embodying my invention.

Line conductors 1 and 2, which may be connected to any suitable source of direct current, supply energy to an electric motor, having an armature 3 and a shunt field-magnet winding 4. A sectional resistor 5, which is in series with the motor armature, is controlled by a series of electromagnetically operable switches 6, 7 and 8.

A resistor 9, which may be, for example, the usual adjustable field-controlling rheostat employed in connection with electric motors, is controlled by a relay switch 10 that is provided with actuating coils 11 and 12. The actuating coils are respectively in series and in shunt relation to the motor armature and are wound to normally oppose each other. During normal operation of the motor, the series coil 11 tends to effect the closing of the relay 10 while the shunt coil 12, which is energized in accordance with the counter-electromotive force of the motor, tends to retain the relay 10 in its open position.

The main circuit of the motor is controlled by an electromagnetically operable line switch 13 having an actuating coil 14 that is controlled by a manually operable switch 15. A switch member 16, that is mechanically connected to the line switch 13, closes a dynamic braking circuit for the motor when the line switch is in its open position. The dynamic braking circuit includes a resistor 17.

To start the motor, the controlling switch 15 is closed to complete a circuit for the coil 14 to effect the closing of the line switch 13. Current then traverses a circuit extending from line conductor 1 through line switch 13, series coil 11, armature 3, resistor 5, and coil 18 to line conductor 2. The relay 10 remains in its closed position because the series coil 11 is traversed by the relatively heavy current supplied to the armature circuit. The coil 12 exerts practically no force upon the relay 10 at this time because the counter-electromotive force of the motor armature is substantially zero.

The switch 6 closes to shunt a section of the resistor 5 through the actuating coil 19 of the switch 7. The latter then closes a shunt circuit for the remaining section of the resistor 5 through a coil 20. The switch 8 is closed by the coil 20 to complete a shunt circuit for the resistor 5 and the actuating coils of switches 7 and 6. The coil 20 acts as a holding coil to retain the switch 8 in its closed position.

When the speed of the motor and its counter-electromotive force reach such values that the coil 12 exerts a force upon the relay 10 that is greater than that exerted by the coil 11 and the force of gravity, the relay 10 opens to insert the resistor 9 in series with the shunt field-magnet winding 4 and the motor is further accelerated because of the resultant diminished field excitation. It will be noted that the operation of the relay 10 occurs when the motor has been accelerated to a predetermined rate at which the value of the current is sufficiently low and the value of the counter-electromotive force of the armature is sufficiently high to render it safe to insert the resistor 9 into the shunt field circuit.

To stop the motor, the switch 15 is opened to de-energize the coil 14 of the line switch 13, and the latter opens to effect the completion of a dynamic braking circuit for the motor comprising the series coil 11, switch member 16 and the resistor 17. The motor now operates as a generator, and current traverses the series coil 11 in a direction opposite to that obtaining during motor operation. The coil 11 therefore induces a relatively heavy flux in the same direction as that of the shunt coil 12 and thus assists the latter in actuating the relay 10 to its open position. The relay 10 will remain in its open position as long as the current traversing the armature circuit and the counter-electromotive force of the motor have such values that the force exerted by the coils 11 and 12 are sufficient to overcome the force of gravity.

When the speed of the motor has fallen to a predetermined rate at which the values of the current traversing the dynamic braking circuit and the counter-electromotive force of the motor are such that the force of gravity is greater than the forces exerted by the actuating coils 11 and 12, the relay 10 closes to shunt the resistor 9 and thereby strengthen the field of the motor during the final portion of the period of dynamic braking. This last step in the operation materially shortens the period of time necessary in bringing the motor to rest at the lower speeds.

It will be noted that, by means of the arrangement above described, I am enabled to provide an electric motor with a strong field during the armature accelerating period, and then to weaken the field automatically to a definite rheostat setting after the armature acceleration has been accomplished; also to employ a relatively weak field during the initial period of dynamic braking and then to increase the field excitation of the motor when the current traversing the motor and the counter electromotive force of the motor fall to predetermined values. The above and other advantages will be apparent to those skilled in the art to which my invention appertains.

I claim as my invention:

1. The combination with a dynamo-electric machine having a field-magnet winding, of means comprising a relay having a series and a shunt actuating coil for first strongly exciting said winding upon the initial operation of said machine as a motor and then weakly exciting said winding during the remainder of the operation of said machine as a motor and for weakly exciting said winding during the operation of said machine as a generator.

2. In a motor-control system, the combination with an electric motor having a field-magnet winding, of means comprising a relay having a series and a shunt actuating coil for temporarily increasing and ultimately decreasing the excitation of said winding during the period of motor acceleration and for decreasing and ultimately increasing said excitation during the period of dynamic braking.

3. In a motor-control system, the combination with a dynamo-electric machine having a field-magnet winding, of means for controlling the excitation of said winding, said means comprising a relay having actuating coils respectively in series and in shunt relation to said dynamo-electric machine tending first to close and then to open said relay to successively increase and decrease the excitation of said winding when the dynamo-electric machine operates as a motor and tending to open said relay to decrease the excitation of said winding when the dynamo-electric machine operates as a generator.

4. In a motor-control system, the combination with an electric motor, means for accelerating said motor, and means for dynamically braking said motor, of a relay having actuating means controlled in accordance with the values of the current and the voltage in the circuit of said motor for decreasing the field excitation of said motor when the speed of the latter reaches a predetermined rate in accelerating and for increasing the field excitation of said motor when its speed has fallen to a predetermined rate during dynamic braking.

5. In a motor-control system, the combination with an electric motor, means for accelerating said motor, and means for dynamically braking said motor, of means comprising a relay having actuating coils in series and in shunt relation to said motor for automatically decreasing the field excitation of said motor when the speed of the latter reaches a predetermined rate in accelerating and for increasing the field excitation of said motor when its speed has fallen to a predetermined rate during dynamic braking.

In testimony whereof, I have hereunto subscribed my name this 31st day of March 1916.

JOHN H. ALBRECHT.